United States Patent
Laqua et al.

(10) Patent No.: US 6,507,126 B1
(45) Date of Patent: Jan. 14, 2003

(54) METHOD FOR LOAD REGULATION IN A THERMAL ENGINE HAVING A POWER GENERATOR

(75) Inventors: Ekkehard Laqua, Oberhausen (DE); Walter Lehr, Stuttgart (DE); Matthias Kirner, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 70 days.

(21) Appl. No.: 09/659,206

(22) Filed: Sep. 11, 2000

(30) Foreign Application Priority Data

Sep. 11, 1999 (DE) .......................... 199 43 614

(51) Int. Cl.[7] .............................. F02N 11/08; H02P 9/04
(52) U.S. Cl. ................................. 290/40 C; 123/179.4
(58) Field of Search ................................ 290/40 R, 41, 290/40 A, 40 B, 40 C, 52; 123/179.4, 2

(56) References Cited

U.S. PATENT DOCUMENTS

| | | | | |
|---|---|---|---|---|
| 4,642,547 A | * | 2/1987 | Redlich | ...................... 290/1 R |
| 5,095,701 A | * | 3/1992 | Nakano | ...................... 290/1 R |
| 5,385,021 A | | 1/1995 | Beale | ............................... 62/6 |
| 5,469,816 A | * | 11/1995 | Murakawa et al. | ............. 123/2 |
| 5,502,968 A | | 4/1996 | Beale | ............................... 62/6 |
| 5,703,410 A | * | 12/1997 | Maekawa | ............... 123/339.16 |
| RE36,437 E | * | 12/1999 | Hanson et al. | ............ 123/179.4 |
| 6,274,941 B1 | * | 8/2001 | Ryhiner | .................... 290/40 A |

* cited by examiner

*Primary Examiner*—Nicholas Ponomarenko
(74) *Attorney, Agent, or Firm*—Kenyon & Kenyon

(57) ABSTRACT

A method for regulating the load in a thermal engine having a power generator in order to keep the voltage or the frequency at the terminals of the power generator constant during load changes using constantly even power usage. Load regulation during load changes by maintaining a constant voltage or frequency in the terminals of the power generator, an electronic system determining the difference between maximum power capacity and present electrical load and this difference being conducted back to the thermal energy process as high-temperature heat by a variable load resistor.

4 Claims, 1 Drawing Sheet

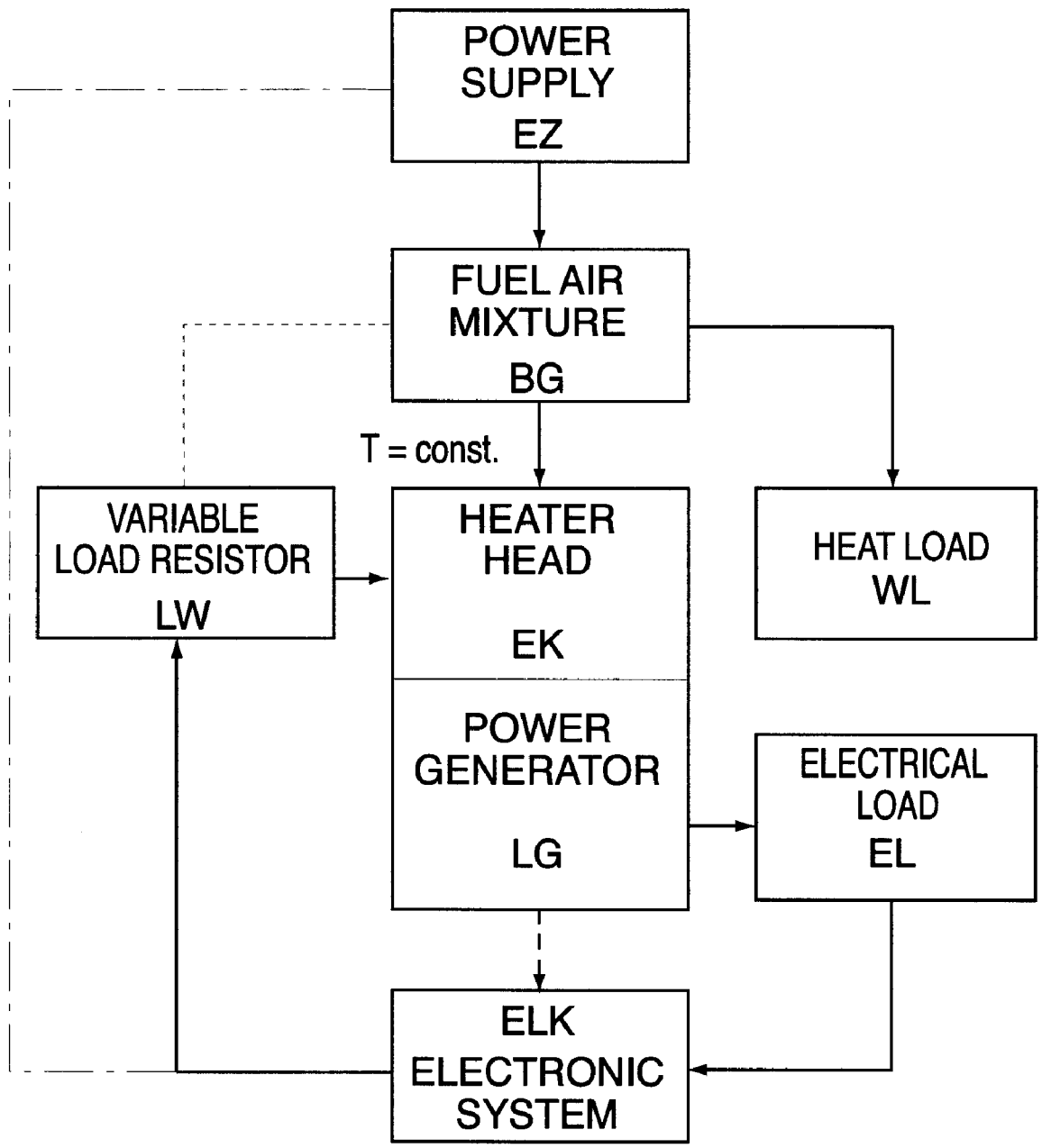

METHOD FOR LOAD REGULATION IN A THERMAL ENGINE HAVING A POWER GENERATOR

FIELD OF THE INVENTION

The present invention relates to a method for regulating the load in a thermal engine having a power generator, in order to keep the voltage or the frequency at the terminals of the power generator constant during load changes by a constantly even power usage.

BACKGROUND OF THE INVENTION

In the case of thermal engines, e.g., a Stirling engine having a linear generator, concepts are applied for regulating load which either require expensive mechanics or use an external electric load in order to keep the voltage (and also the frequency, in the case of rotary machines) at the terminals constant, as U.S. Pat. No. 5,385,021 and U.S. Pat. No. 5,502,968 show.

The necessary mechanics are not only cost-intensive, but also susceptible to malfunctions. The external electric load converts high-value electric current into low-value heat and is consequently uneconomical.

SUMMARY OF THE INVENTION

It is an object of the present invention to provide a method which can be achieved without expensive mechanics that are susceptible to malfunctions and in which surplus electrical energy can simply be conducted to the thermal energy process.

This object is achieved according to the present invention in that an electronic system determines the difference between the maximum power capacity and the attached electrical load, and this difference can in turn be conducted by a variable load resistor to the thermal energy process as high-temperature heat.

The electrical energy that is not consumed by a load is retained in the thermal energy process.

The difference between the maximum power capacity of the thermal engine and the present load can be determined quickly and reliably by an electronic system having a high degree of operating reliability. This power difference may then in turn be conducted to the thermal energy process via an assigned variable load resistor at a high temperature.

This can occur in different manners. One embodiment of the present invention is thus characterized in that, in a thermal engine having a Stirling engine and a heater head, the variable load resistor directly heats the heater head as a heater resistor.

Another possibility is provided in that the variable load resistor heats the fuel-air mixture supplied to the thermal engine as a heater resistor.

According to another embodiment, the fuel supply to the thermal engine is reducible in order to prevent a temperature increase in the heater head.

BRIEF DESCRIPTION OF THE DRAWINGS

The FIGURE shows a circuit diagram for illustrating the method according to the present invention.

DETAILED DESCRIPTION

In the circuit diagram of the thermal engine, the heater head of the Stirling engine is labeled with EK and the power generator, designed as a linear generator, with LG. Their operation in the thermal energy process is known and, therefore, does not need to be further explained. A part of the heat generated during combustion from fuel-air mixture BG, which is being supplied, is consumed as a heat load WL, while changing electrical load EL is applied to the terminals of power generator LG. Electronic system ELK now determines the actual electrical load EL used with the maximum power capacity of the thermal engine, as the arrows between power generator LG and electronic system ELK and between electrical load EL and electronic system ELK indicate. Electronic system ELK controls a variable load resistor LW so that for a constant load on the power generator LG, this differential energy is conducted back to the thermal energy process of the thermal engine as high-temperature heat. As the arrow between load resistor LW and heater head EK indicates, it can be directly used for heating up heater head EK.

As indicated by the dotted line between load resistor LW and fuel-air mixture BG, the fuel-air mixture BG being supplied can be more or less heated, i.e., pre-heated, according to the determined difference.

As indicated in the dash-dotted line between electronic system ELK and power supply EZ, power supply EZ can be changed accordingly as a function of the determined difference between the thermal engine's maximum power capacity and present electrical load EL, in order to prevent over-heating in the heater head EK, whose temperature T is preferably kept constant.

The design of the thermal engine can also be different. The method according to the present invention may, however, be similarly applied if the surplus electrical energy is conducted back to the thermal energy process of the thermal engine in an equivalent arrangement.

What is claimed is:

1. A method for regulating a load in a thermal engine having a power generator in order to keep at least one of a voltage and a frequency at terminals of the power generator constant through an unchanging power consumption, comprising the steps of:

determining a difference between a maximum power capacity and an applied electrical load using an electronic system; and feeding the difference back to a thermal energy process as high-temperature heat using a variable load resistor.

2. The method according to claim 1, wherein the thermal engine is a Stirling engine and has a heater head, and further comprising the step of directly heating the heater head using the variable load resistor acting as a heater resistor.

3. The method according to claim 1, further comprising the step of heating a fuel-air mixture facing the thermal engine using the variable load resistor as a heater resistor.

4. The method according to claim 1, further comprising the step of reducing a fuel supply to the thermal engine in order to prevent an increase of temperature in a heater head of the thermal engine.

* * * * *